United States Patent
Sasselli

(10) Patent No.: US 8,117,647 B2
(45) Date of Patent: Feb. 14, 2012

(54) METHOD FOR GENERATING A PLURALITY OF UNIQUE SECURE NUMBERS AND CARD COMPRISING SUCH A NUMBER

(75) Inventor: Marco Sasselli, Chardonne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 993 days.

(21) Appl. No.: 11/990,750

(22) PCT Filed: Aug. 28, 2006

(86) PCT No.: PCT/EP2006/065748
§ 371 (c)(1), (2), (4) Date: Feb. 21, 2008

(87) PCT Pub. No.: WO2007/025954
PCT Pub. Date: Mar. 8, 2007

(65) Prior Publication Data
US 2009/0125975 A1    May 14, 2009

(30) Foreign Application Priority Data
Aug. 31, 2005 (EP) .................................... 05107984

(51) Int. Cl.
*G06F 15/16* (2006.01)
*G06F 21/00* (2006.01)

(52) U.S. Cl. ......................................... 726/6; 713/184
(58) Field of Classification Search ................. 726/1–9
See application file for complete search history.

(56) References Cited

U.S. PATENT DOCUMENTS
5,577,109 A * 11/1996 Stimson et al. ............ 379/114.2

FOREIGN PATENT DOCUMENTS
| GB | 2369800 | | 6/2002 |
| GB | 2369800 A | * | 6/2002 |
| GB | 2396946 | | 7/2004 |
| WO | 00/49586 | | 8/2000 |

* cited by examiner

*Primary Examiner* — Ashok Patel
*Assistant Examiner* — Evans Desrosiers
(74) *Attorney, Agent, or Firm* — Harness, Dickey & Pierce, P.L.C.

(57) ABSTRACT

A process is provided for enabling the generation of valid secure numbers during a given period, these secure numbers having an optimal security level, while preserving the possibility for creating additional numbers or increasing the security level in accordance with the requirements. In at least one embodiment, the method permits the generation of as many secure numbers as are required, while having a maximum security level, which reduces the risks of sending a random number allowing the assignment of entitlements or a credit. The contradictory parameters for the quantity of generated numbers and security can be corrected at any time.

6 Claims, 3 Drawing Sheets

| SN (secured number) | |
|---|---|
| IN (Identification number) | VC |
| VIT | INP |

| SN | |
|---|---|
| IN | VC |
| VIT | INP |

| IN1 | IN2 | VC1 | VC2 | SN | Min | Max |
|---|---|---|---|---|---|---|
| 0 | 0 | 0 | 0 | 00000 | 0000 | 0099 |
| 0 | 1 | 1 | 1 | 10111 | 0100 | 0199 |
| 0 | 2 | 2 | 2 | 20222 | 0200 | 0299 |
| 0 | 3 | 3 | 3 | 30333 | 0300 | 0399 |
| 0 | 4 | 4 | 4 | 40444 | 0400 | 0499 |
| 0 | 5 | 5 | 5 | 50555 | 0500 | 0599 |
| 0 | 6 | 6 | 6 | 60666 | 0600 | 0699 |
| 0 | 7 | 7 | 7 | 70777 | 0700 | 0799 |
| 0 | 8 | 8 | 8 | 80888 | 0800 | 0899 |
| 0 | 9 | 9 | 9 | 90999 | 0900 | 0999 |
| 1 | 0 | 0 | 1 | 11011 | 1000 | 1099 |
| ... | ... | ... | ... | ... | ... | ... |
| 2 | 1 | 1 | 1 | 32113 | 2100 | 2199 |
| 2 | 2 | 2 | 0 | 42204 | 2200 | 2299 |
| 2 | 3 | 3 | 1 | 52315 | 2300 | 2399 |
| 2 | 4 | 4 | 2 | 62426 | 2400 | 2499 |
| 2 | 5 | 5 | 3 | 72537 | 2500 | 2599 |
| 2 | 6 | 6 | 4 | 82648 | 2600 | 2699 |
| 2 | 7 | 7 | 5 | 92759 | 2700 | 2799 |
| 2 | 8 | 8 | 6 | 02860 | 2800 | 2899 |
| 2 | 9 | 9 | 7 | 12971 | 2900 | 2999 |
| 3 | 0 | 0 | 3 | 33033 | 3000 | 3099 |
| 3 | 1 | 1 | 2 | 43124 | 3100 | 3199 |
| ... | ... | ... | ... | ... | ... | ... |

FIG 2A

| IN1 | IN2 | IN3 | VC1 | SN | Min | Max |
|---|---|---|---|---|---|---|
| 2 | 3 | 1 | 6 | 62316 | 2310 | 2319 |
| 2 | 3 | 2 | 7 | 72327 | 2320 | 2329 |
| 2 | 3 | 3 | 8 | 82338 | 2330 | 2339 |
| 2 | 3 | 4 | 9 | 92349 | 2340 | 2349 |
| 2 | 3 | 5 | 0 | 02350 | 2350 | 2359 |
| 2 | 3 | 6 | 1 | 12361 | 2360 | 2369 |
| 2 | 3 | 7 | 2 | 22372 | 2370 | 2379 |
| 2 | 3 | 8 | 3 | 32383 | 2380 | 2389 |
| 2 | 3 | 9 | 4 | 42394 | 2390 | 2399 |
| 2 | 4 | 0 | 6 | 62406 | 2400 | 2409 |
| 2 | 4 | 1 | 7 | 72417 | 2410 | 2419 |
| 2 | 4 | 2 | 8 | 82428 | 2420 | 2429 |
| 2 | 4 | 3 | 9 | 92439 | 2430 | 2439 |
| 2 | 4 | 4 | 0 | 02440 | 2440 | 2449 |
| 2 | 4 | 5 | 1 | 12451 | 2450 | 2459 |
| 2 | 4 | 6 | 2 | 22462 | 2460 | 2469 |
| 2 | 4 | 7 | 3 | 32473 | 2470 | 2479 |
| 2 | 4 | 8 | 4 | 42484 | 2480 | 2489 |
| 2 | 4 | 9 | 5 | 52495 | 2490 | 2499 |
| 2 | 5 | 0 | 7 | 72507 | 2500 | 2509 |

METHOD FOR GENERATING A PLURALITY OF UNIQUE SECURE NUMBERS AND CARD COMPRISING SUCH A NUMBER

TECHNICAL FIELD

The present invention relates to a method for generating a plurality of unique secure numbers, these numbers being printed, for example, on a physical support and allowing, after verification of their authenticity, notably an access to entitlements or to obtaining a credit. The invention also relates to a physical support receiving such a number.

PRIOR ART

Nowadays, there are a lot of ways to obtain a credit or an entitlement for a particular application. Among these, we can cite the example of "scratch cards" comprising a printed number, hidden by an opaque ink. When the user buys the card, he removes the opaque ink in such a way that the printed number is allowed to appear. Then he sends this number, for instance in the form of an SMS (Short Message Service) by means of a mobile phone to a management centre. The latter verifies the validity of the number received. In the case of validity, the entitlement or credit related to this number is assigned.

It is clear that the attribution of entitlements or credit should only be obtained if the sent number is valid, which means that it should not be possible to obtain the desired credit or entitlement by sending a random number.

For this, current secure numbers are constituted on one hand of an identification number and on the other hand of a control value. The identification number can be a random number and represents the first part of the secure number.

The control value is a number that depends on the identification number. More specifically, this control value can be calculated from the identification number, secret information such as a key and from an arithmetic rule. This control value represents the second part of the identification number.

When a user sends a complete number to the management centre, the identification number is extracted from the complete number received. The control value is calculated from this identification number. This calculated control value is compared to the received control value. The entitlement or credit is conceded only if these two control values correspond to each other.

The total length of the secured number is generally fixed by the service provider. This length is identical for all the secure numbers from a given operator. It should not be too long to avoid the user sending a large sequence of digits. Nor should It be too short, so as not to limit the number of possible combinations on one hand and on the other hand to ensure a sufficient security level.

In current secure numbers, the length of the secure number is separated in two fixed length "fields". One of the fields, for example the one comprising the most significant digits represents the identification number (IN) and the other field, containing the least significant digits, represents the control value (VC).

It is clear that the fewer the number of digits in the identification number (IN) the lower the amount of identification numbers that can be generated. However, the security will be greater.

Inversely, the larger the identification number (IN) field, the higher the amount of possible identification numbers. At the same time, the security is reduced.

One of the problems involves finding a good balance between these two contradictory constraints.

Physical supports such as "scratch cards" comprising such a number generally have a limited duration of validity, but that can be relatively long, for example two years. As these numbers have a finite length, it is necessary to ensure that it will be possible to generate different secure numbers for the duration of the cards' total period of validity. For this, it is thus necessary to expect the part forming the identification number to be sufficiently long. If this part is too short, it will no longer be possible to generate new numbers after a certain time using the system, i.e. after the creation of a certain amount of secure numbers. All the possibilities offered by the size of the identification number will be depleted. It is thus necessary, from the beginning, to provide a sufficiently large space to generate enough distinct identification numbers during the validity period of a card. This is done to the detriment of security. In fact, as the total length of the secure number is limited, the larger the space used for identification numbers, the smaller the space that remains for the control value.

DESCRIPTION OF THE INVENTION

The present invention aims to provide a method enabling the generation of valid secure numbers during a given period, said secure numbers having an optimal security level, while conserving the possibility to create some additional numbers or to increase the security level according to needs.

The method of the invention thus allows the generation of as many secure numbers as necessary, while maintaining a maximum security level, which reduces by as much the risk that the sending of a random number will allow the attribution of entitlements or a credit. The contradictory parameters for the quantity generated numbers and security can be corrected at any time.

The aims of the invention are attained by a method for generating a plurality of unique secure numbers (SN) having a predefined fixed length, the secure numbers being formed from at least one identification number (IN) and a control value (VC), this method comprising the steps of:

determining a first quantity of secure numbers to be generated;

determining the minimal number of digits required for generating said first quantity of secure numbers;

generating a first series of unique identification numbers (IN), these identification numbers having a length at least equal to the minimal number of digits required for generating the secure numbers (SN), these identification numbers being selected from all the possible numbers having the required length;

associating a control value (VC) with each identification number (IN), this control value having a length such that the total length of the secure numbers will correspond to said predefined fixed length;

prior to the use of all the available identification numbers of the first identification numbers series, determining a second additional quantity of secure numbers to be generated;

calculating the number of remaining identification numbers that can be generated from the number of digits forming the identification numbers of the said first series;

if the second quantity of identification numbers to be generated is superior to the said number of remaining identification numbers, determining the new minimal number of digits required for generating the said quantity of second identification numbers;

determining at least one non-used identification number among the identification numbers that can be generated using the number of digits of the first quantity of identification numbers;

generating a second series of unique identification numbers (IN), these identification numbers being formed from unused identification numbers among the identification numbers that can be generated by using the number of digits of the first quantity of identification numbers, these identification numbers of the second series of numbers having a length at least equal to the new minimal number of digits required for generating said identification numbers (IN) of this second series of numbers.

In the scope of the invention, the generated secure numbers are valid for a finite period, for example of two years. The numbers that have been generated, but that have not been used during this finite period are no longer valid. It is clear that all the secure numbers are not generated at the same time. On the contrary, they are batch-generated, for example every month. It is thus possible that at the beginning of setting-up a service using such secure numbers, the quantity of numbers to generate during the first month is lower than the quantity of numbers to generate after a long period of use.

The process of this invention thus allows the adaptation of the amount of generated secure numbers and the security level during each temporal interval.

Furthermore, this process is based on an estimate of the amount of secure numbers to generate during a temporal interval. If this estimate is erroneous, either in an optimistic or in a pessimistic sense, it is possible to correct the amount of secure numbers and the security level during a temporal interval.

For this purpose, the validity duration of secured numbers is determined. It is generally the supplier of "physical supports" comprising said secure numbers who imposes this duration. A temporal period is then chosen, which is at the most equal to the validity duration, but generally it is a fraction of this validity duration. An estimate is then made of the quantity of different secured numbers to generate during this temporal period. The field size representing the identification number with regard to the quantity of secure numbers is then estimated. Thereby, this field has a variable length in accordance with the estimate that has been made. The remaining digits are used to represent the control value.

If the size of the field reserved for generating the identification numbers is not sufficient during a temporal unit, it is possible to displace the frontier to the right during the temporal unit, in order to add possible numbers. On the contrary, if the previsions are too optimistic and the field size for the identification numbers is too large, it is possible to displace the frontier to the left, thus improving security.

These frontier displacements can occur during a temporal unit or at the end of such a unit, for the following temporal unit.

Use of such a secure number is of course, submitted to a verification which allows one to determine if the sent control value correctly corresponds to the identification number received. The method according to the invention allows an optimal verification and particularly the detection of a systematic attack attempt from a given identification number.

BRIEF DESCRIPTION OF DRAWINGS

The present invention and its advantages will be better understood in reference to the enclosed drawings and to the detailed description of a particular embodiment in which:

FIG. 2A represents a table in a decimal value form, of generated secure numbers according to the present invention;

FIG. 2B is a variant of the table in FIG. 2A;

FIG. 3A represents a table containing the generated secure numbers according to the method of the invention;

FIG. 3B is a variant of the table in FIG. 2A

FIG. 3C is another variant of the table in FIG. 2A

WAYS TO CARRY OUT THE INVENTION

Figures 1A, 1B, 4:
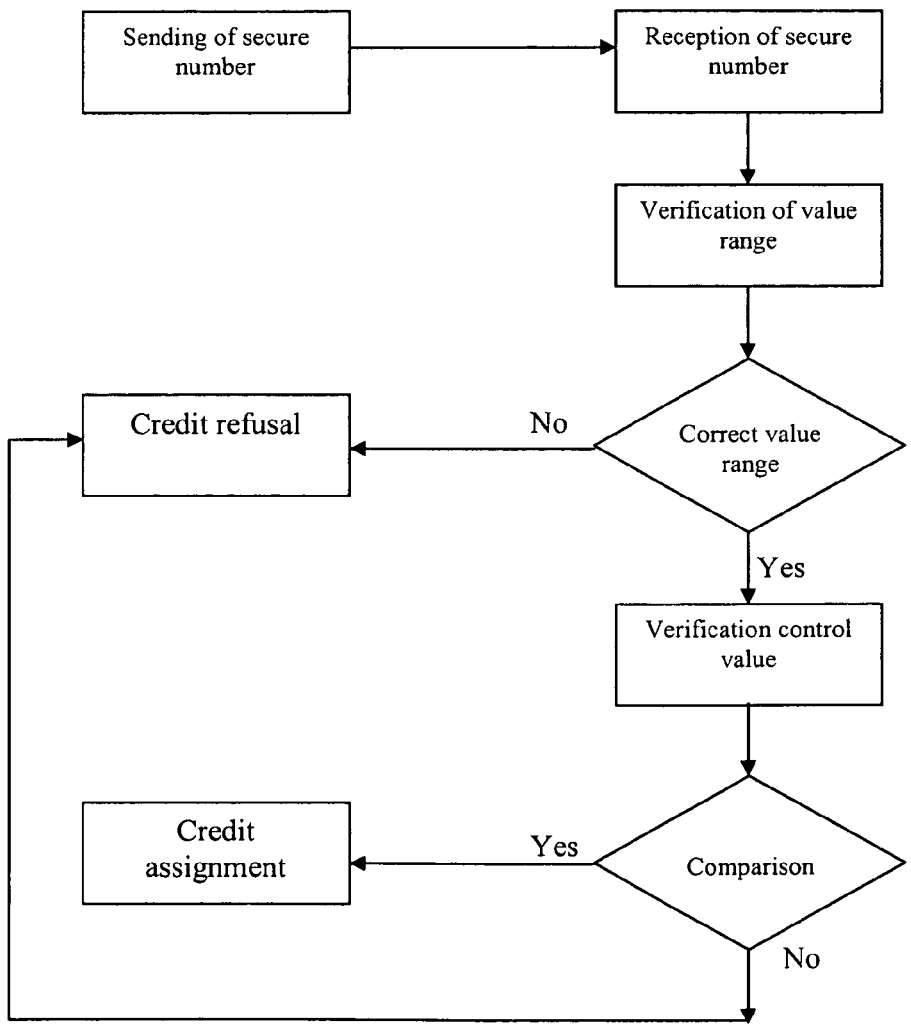
FIG. 1A represents the structure of a first generated secure number according to the method of the invention.
FIG. 1B represents the structure of a second generated secure number according to the method of the invention.
FIG. 4 is a block-diagram representing the verification of a generated secure number according to the present invention.

In practice, it is clear that the number of different secure numbers that can be generated must to be relatively large to respond to the entire request.

However, in the description of the invention principle, some sufficiently low values will be used in order to manipulate them easily.

According to the present invention and as in the prior art, the secure number (SN) includes an identification number (IN) on the one hand and a control value (VC) on the other hand, that depends on this identification number. This secured number is generally written on a physical support such as a card of the "scratch card" type or a payment receipt for example. It could also be displayed on a screen such as a computer or a television screen. In the following description, the support is assumed to be a card. In all the cases, the operating principle is the same.

According to a concrete embodiment example, the number inscribed on the support, i.e. the secure number SN, is a decimal number that can be, for example, comprised of 16 digits, such a number of digits being defined by the operator. To process this number in a management or a verification centre, it is converted into a binary number.

As it can be calculated, a decimal number of 16 digits can be represented in a binary form by means of 53 binary digits or 53 bits, due to the fact that $2^{53}$ is a number of 16 digits whereas $2^{54}$ comprises 17 digits. This 53 bit value is thus the total length of the identification number IN and the control value VC.

The method of the present invention operates in the following manner. A maximum duration of validity for a card is first determined. The operator generally imposes this duration, which in the following description is fixed for two years.

This maximum duration is then divided into shorter temporal intervals, in such a way that the number of intervals is "reasonable" and the quantity of secure numbers to generate during a temporal interval is significant enough. As an example, for a maximum duration of 2 years, a one month temporal interval is an appropriate value.

From the maximum duration and the chosen interval, the number of digits, which will be available for representing all the intervals, is determined. More concretely, for one-month intervals during a 2 years period, there will be 24 months. In a decimal mode, two digits will be necessary for representing each of the 24 months. In a binary mode, 5 binary digits or 5 bits will be necessary to represent the 24 months, as $2^4$ is equal to 16 which is lower than 24 and thus not enough whereas $2^5=32$ is sufficient to represent 24 different values.

According to the invention, the identification number IN is separated into a value representing the temporal interval VIT and a numerical identification part INP. In principle, the temporal interval VIT duration is fixed. It is generally incremented from 1 at each change of a temporal period. Thereby, for one given month and year, for instance August, it will be equal to 00000, then 00001 the following September and so on until 11111. After which, the cycle will restart. Given that the maximum duration of validity has lapsed before the cycle restarts, it is not possible to have two identical valid cards.

The total length of the secure number minus the length reserved for the temporal interval is therefore available for the numerical part and the control value.

The following step of the process involves evaluating the quantity of different secure numbers that will have to be generated during the next temporal interval. This evaluation can generally be made following the indications given by the operator. As it is explained in more detail herein, one of the advantages of the method of this invention is to allow a simple adjustment in the quantity of secure numbers generated during a temporal interval. Thereby, especially at the beginning of system set-up, if the evaluations are too optimistic or otherwise too pessimistic, some modifications can be carried out during a temporal interval.

When the quantity of secured numbers to be generated for the related temporal interval has been evaluated, then the minimal length required to generate this quantity of numbers is determined. For example, if the number of secure numbers to generate during one given month is evaluated at 100,000, 17 bits will be necessary. Indeed, 16 bits are insufficient since $2^{16}=65,536$ is lower than the evaluated quantity whereas $2^{17}=131,072$ is higher than the evaluated quantity.

Then, a certain amount of different numbers will be chosen among the possible secured numbers, i.e. in the considered example, among 131,072 numbers, until the desired quantity is reached, namely 100,000 in our example.

The total length of the secure number SN minus the length used by the temporal interval VIT minus the one used for the numerical part INP give us the total useable length for the control value. Turning to the concrete example described above, for a 53 bits secure number, there are 5 bits for the temporal interval, 17 bits for the numerical part, which corresponds to a total of 22 bits for the identification number. The control value VC thus has a length of 53–22=31 bits. This control value depends on the identification number. According to a method of generating this control value, the identification number is taken, to which some data are possibly added, an operation is then applied to the whole. Such an operation could be a key hashing function for example, or any other function in which it is necessary to know secret information for calculating a control value from the identification number.

Modification of the Available Quantity of Secure Numbers

The following description is based on FIGS. 2 and 3 and concerns the operating method when a quantity of secure numbers that must be generated differ from the one which has been evaluated initially.

FIGS. 2A and 2B describe an example where the temporal interval identifier is omitted for reasons of clarity and the secure number includes 4 decimal digits.

First of all, it has been determined that it will be necessary to generate a maximum of 100 secure numbers. For this purpose, two decimal digits are enough. The first two columns IN1 and IN2 in FIG. 2A contain the possible values for generating 100 different numbers, i.e. values from 00 to 99. The control value also comprises 2 digits in order to respect a total length of 4 digits. This control value is indicated in the columns noted as VC1 and VC2 in FIG. 2A. In the example chosen, the column VC1 contains the absolute value of the difference between the two digits forming the identification number, and column VC2 contains their sum modulo 10.

The secure number SN is formed from the concatenation of the 4 digits indicated in columns IN1, IN2, VC1 and VC2.

As previously indicated, it is possible to generate 100 different secured numbers using two decimal digits. If during the temporal interval, the estimated quantity of secure numbers is proved insufficient, it is possible to add some of these, which is illustrated in FIG. 2B.

In this figure, the identification number is no longer formed with 2 digits, but rather three, written down as IN1, IN2 and IN3 in the figure. The result is that from a line of the table in FIG. 2A, representing a secure number, it is possible to generate 10 lines in the table of FIG. 2B, representing ten secure numbers.

In this case, the control value comprises only one digit, here the sum modulo 10 of digits forming the identification number, in order to preserve the total length of 4 digits.

Figures 3A, 3B, 3C:
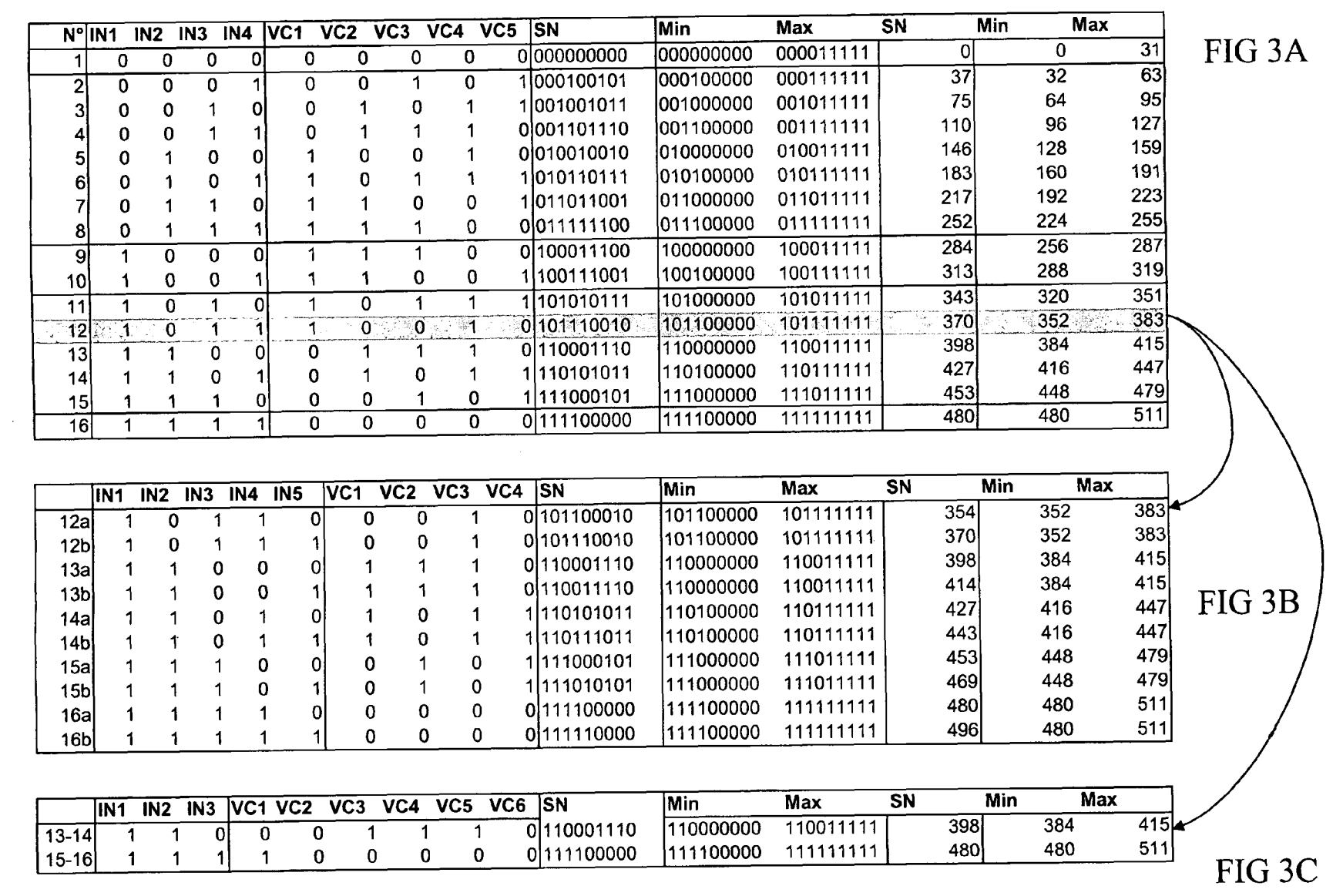

The FIGS. 3A, 3B and 3C illustrate a similar example, wherein the number inscribed on the card is decimal, but the values used for the processing and the generation of these numbers is binary, which is generally the case in practice.

In the example in FIG. 3A, it is assumed that the total length of the secure number is 9 bits and that the length of the identification number is 4 bits. This allows for generating 16 different secure numbers, noted from 1 to 16 in the left column of the figure.

We can imagine that from the 11th secure number generated, it is noted that 16 possibilities are not sufficient, it will be possible, as shown in the table in FIG. 3B, to use an additional bit for generating the identification number. Thereby, the $12^{th}$ identification number, which is 1011 in FIG. 3A, can be divided in 10110 and 10111. The same occurs for the following numbers. Thereby, each secure number in FIG. 3A can produce 2 secure numbers as indicated in FIG. 3*b*.

However, instead of 5 bits available for the control value in FIG. 3A, only 4 remain in the FIG. 3B. The security is thus weakened.

On the contrary, if it is noticed that the amount of available numbers is too large, it is possible, as shown in FIG. 3C, to reduce this quantity by using no more than three bits for generating the identification number. Thereby, the numbers 13 and 14 in the FIG. 3A, i.e. 1100 and 1101 form only one possibility in the FIG. 3C, namely 110. However, the control value is encoded in 6 bits, which improves the security.

This flexibility in the modification of the binary digits or decimal numbers used for forming the identification number and the control value offer two advantages. On one hand, this allows the modification of the quantity of secure numbers that can be generated and the associated security, during a temporal interval, in order to correct an erroneous estimate for example. On the other hand, this allows adaptation of this quantity at the beginning of each temporal interval, particularly with regard to evolution in the use of secure numbers.

Verification of a Sent Secure Number

The previous description concerns the method of generating secure numbers as well as their structure.

The following description concerns the use of such a secure number, and more particularly determination by a control organ, of the authenticity of a number received from a user.

When a user sends a secure number, a two-step verification is provided to determine if this number is authentic and authorizes a credit for example, or if it is false.

Step 1

In the first step, the number is sent to a management centre. It should be noted that this centre does not necessarily know the length of the identification number since it can vary during a temporal interval. However, from the identification number IN, the centre can know a value range wherein this number is comprised. As an example, returning to the case of FIG. 3A, we can imagine that between the 16 mentioned possibilities, the possibilities No. 2 to 8 and 11 to 15 have been chosen for producing the secure numbers put into circulation. The others possibilities did not produce secure numbers put into circulation.

For each secure number put into circulation, a minimal value and a maximum value associated to this number will be determined. By taking the secure number inscribed with the reference 2 in the FIG. 3A for instance, the corresponding identification number is 0001. The secure number is formed by 8 bits. The minimal value that the secure number can have being 0001, as the four most significant bits are 00010000, which corresponds to the identification number concatenated with 0s, until the desired length is reached. In a similar way, the maximum value corresponds to the identification number concatenated with some 1s, being 00011111. By converting these numbers to decimal values, there is a lower marker equal to 32 and an upper marker equal to 63.

In the FIGS. 3A, 3B and 3C, the lower markers of intervals appear in the column entitled "Min" and the upper markers in the column entitled "Max".

The management centre does not know the exact secure numbers, but knows the associated ranges for the secure numbers that have been attributed.

If a user sends the secure number 284, corresponding to case 9 of FIG. 3A, based on the hypothesis that this secure number has not been attributed, the management centres will verify if this value 284 belongs to an authentic range. Returning to the previous hypothesis, the attributed value ranges are 32-255; 320-479. The value 284 is not part of any attributed range. The management centre will thus consider it to be a false value and the associated entitlement or credit will not be attributed. Since the sent number has not passed this first verification step, it is not transmitted to undergo the second step.

If the user sends the secure number corresponding to case 12, namely 370, the management centre will be able to check that this value is really part of the valid ranges and will be able to proceed to the second verification step.

Step 2

In this second step, the secure number is transmitted to a verification centre. This centre contains the list of valid identification numbers IN on the one hand and on the other hand, the associated control value VC. As indicated previously, this control value is formed by the identification number to which some data are possibly added and to which an operation is applied. This operation can be an encryption for example, a key hashing function or any other operation that does not allow easily founding the starting data when the control value is known.

It should be noted that the secure number is generally provided in a decimal form whereas it is treated in a binary form in the management and verification centers. Prior to the control operations, the received decimal value is thus generally transformed into a binary value.

It should also be noted that the secure number could be written in alphanumeric form, as long as there are appropriate transmission means. In this case, this alphanumeric code should be converted to a usable format by the management centre, typically in a binary form.

When receiving the identification number IN, the verification centre adds the previously mentioned data and applies the key hashing function, for example the key of the month. Then, it compares the calculated result to the expected result, the latter being memorized in the verification centre.

If the calculated result corresponds to the expected result, the secure number is considered valid and the entitlement or the right is awarded. Otherwise, the credit or right is refused.

When the secure number is sent after the end of the validity period, even if the identification number is correct, the key or the secret information used to calculate the control value from the identification number will have changed. In this case, the calculated control value will be different to the expected control value and the secure number will be considered invalid.

The invention claimed is:

1. Method for controlling granting of rights based on a plurality of secure numbers, said secure numbers having a fixed length, the secure numbers of said plurality of secure numbers being formed from at least one identification number and a control value, this method comprising the steps of:

determining a first quantity of secure numbers to be generated;

determining a first minimal number of digits required for generating said first quantity of secure numbers;

generating a first series of unique identification numbers, the first series of unique identification numbers having a first chosen number of digits at least equal to the first minimal number of digits required for generating the secure numbers, the first series of unique identification numbers being selected from all possible numbers having the first chosen number of digits;

associating a control value with each of the unique identification numbers of the first series of unique identification numbers, the control value having a length such that a total length of the secure numbers will correspond to said fixed length;

forming a first set of secure numbers, from among the plurality of secure numbers, based on the first series of unique identification numbers;

prior to use of all available identification numbers of the first series of unique identification numbers, determining a second quantity of secure numbers to be generated in addition to the first quantity of secure numbers;

calculating a number of remaining identification numbers from among the first series of unique identification numbers that can be generated from the first chosen number of digits forming the unique identification numbers of the said first series;

if the second quantity of secure numbers to be generated is superior to the said number of remaining identification numbers from among the first series of unique identification numbers, determining a second minimal number of digits required for generating the said second quantity of secure numbers;

determining at least one non-used identification number from among the first series of unique identification numbers that can be generated using the first number length;

generating a second series of unique identification numbers, the second series of unique identification numbers being formed from unused identification numbers from among the first series of unique identification numbers, the second series of unique identification numbers having a length at least equal to the second minimal number of digits required for generating said identification numbers of the second series of unique second series of numbers;

forming a second set of secure numbers, from among the plurality of secure numbers, based on the second series of unique identification numbers;

sending from a user, by means of a user's device, at least one secure number from among the plurality of secure numbers;

checking in a management center, the validity of at least one secure number from among the plurality of secure numbers;

transmitting the at least one secure number to a verification center;

performing a calculation at the verification center based on the at least one secure number to generate a verification result; and determining if rights should be assigned or denied based on the verification result.

2. Method for generating a plurality of unique secure numbers according to claim 1, wherein if the second quantity of secure numbers to be generated is lower than the said remaining quantity of identification numbers from among the first series of unique identification numbers, determination of the second minimal number of digits required for generating the said second quantity of secure numbers;

determination of a number of the second series of unique identification numbers that can be generated using said second minimal number of digits required for generating said second quantity of secure numbers, the second series of unique identification numbers being different from the secure numbers including the identification numbers of first series truncated at the length of the identification numbers of the second series;

if the amount of identification numbers that can be generated by using the second minimal number of digits is higher than the second quantity, generation of the second series of unique identification numbers having a length equal to the second minimal number of digits required for generating said second quantity of secure numbers and such that the second series of unique identification numbers are different from the secure numbers including the first series of unique identification numbers truncated at the length of the identification numbers of the second series.

3. Method for generating a plurality of unique secure numbers according to claim 1, wherein a number of secure numbers to be generated during a temporal interval is determined.

4. Method for generating a plurality of unique secure numbers according to claim 3, wherein said temporal interval corresponds to all or part of a maximum validity duration for each of the secure numbers.

5. Method for generating a plurality of unique secure numbers according to claim 2, wherein a number of secure numbers to be generated during a temporal interval is determined.

6. Method for generating a plurality of unique secure numbers according to claim 5, wherein said temporal interval corresponds to all or part of a maximum validity duration for each of the secure numbers.

* * * * *